(12) United States Patent
Andersen et al.

(10) Patent No.: US 11,084,719 B2
(45) Date of Patent: Aug. 10, 2021

(54) AMMONIA CRACKING

(71) Applicant: EQUINOR ENERGY AS, Stavanger (NO)

(72) Inventors: Henrik Solgaard Andersen, Tolvsrød (NO); Knut Ingvar Åsen, Porsgrunn (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 16/085,349

(22) PCT Filed: Mar. 14, 2016

(86) PCT No.: PCT/NO2016/050045
§ 371 (c)(1),
(2) Date: Sep. 14, 2018

(87) PCT Pub. No.: WO2017/160154
PCT Pub. Date: Sep. 21, 2017

(65) Prior Publication Data
US 2019/0084831 A1    Mar. 21, 2019

(51) Int. Cl.
*C01B 3/04* (2006.01)
*F02C 3/22* (2006.01)
(Continued)

(52) U.S. Cl.
CPC .............. *C01B 3/047* (2013.01); *B01D 53/58* (2013.01); *B01J 23/755* (2013.01); *F02C 3/22* (2013.01);
(Continued)

(58) Field of Classification Search
CPC .................................................... C01B 3/047
See application file for complete search history.

(56) References Cited

U.S. PATENT DOCUMENTS 3,403,975 A * 10/1968 Frilette ................... C01B 3/047
423/363
4,037,404 A *  7/1977 Bougain ................. F01D 5/026
60/223
(Continued)

FOREIGN PATENT DOCUMENTS

CN     102562310 A     7/2012
JP    2012-255420 A    12/2012
(Continued)

OTHER PUBLICATIONS

Offshore Power Generation Using Natural Gas From Remote Deepwater Developments Peter J. Hill, P.E. et al Offshore Technology Conference, OTC 14289, pp. 1-7 (Year: 2002).*

(Continued)

*Primary Examiner* — Douglas B Call
(74) *Attorney, Agent, or Firm* — Birch, Stewart, Kolasch & Birch, LLP (57) ABSTRACT

A process for generating power using a gas turbine, comprising the steps of: (i) vaporising and pre-heating liquid ammonia to produce pre-heated ammonia gas; (ii) introducing the pre-heated ammonia gas into an ammonia-cracking device suitable for converting ammonia gas into a mixture of hydrogen and nitrogen; (iii) converting the pre-heated ammonia gas into a mixture of hydrogen and nitrogen in the device; (iv) cooling the mixture of hydrogen and nitrogen to give a cooled hydrogen and nitrogen mixture; (v) introducing the cooled hydrogen and nitrogen mixture into a gas turbine; and (vi) combusting the cooled hydrogen and nitrogen mixture in the gas turbine to generate power.

25 Claims, 2 Drawing Sheets

(51) Int. Cl.
    *F02C 3/28*         (2006.01)
    *B01D 53/58*      (2006.01)
    *B01J 23/755*     (2006.01)

(52) U.S. Cl.
    CPC ............ *F02C 3/28* (2013.01); *B01D 2256/10* (2013.01); *B01D 2256/16* (2013.01); *B01D 2257/406* (2013.01); *Y02E 20/18* (2013.01)

(56) References Cited

U.S. PATENT DOCUMENTS

| | | | |
|---|---|---|---|
| 4,704,267 A * | 11/1987 | DiMartino | C01B 3/047 423/351 |
| 8,220,268 B2 | 7/2012 | Callas | |
| 2011/0011354 A1* | 1/2011 | Dincer | F02B 43/10 123/3 |
| 2011/0283960 A1 | 11/2011 | Hikazudani et al. | |
| 2012/0148925 A1 | 6/2012 | Grannell et al. | |
| 2012/0167840 A1 | 7/2012 | Miyagawa et al. | |
| 2013/0227954 A1* | 9/2013 | Marini | F02C 9/54 60/773 |
| 2014/0008913 A1 | 1/2014 | Akiyama et al. | |
| 2014/0311428 A1 | 10/2014 | Miyagawa | |
| 2018/0230006 A1* | 8/2018 | Finkelshtain | C01B 3/04 |

FOREIGN PATENT DOCUMENTS

| | | |
|---|---|---|
| WO | WO 2011/004344 A1 | 1/2011 |
| WO | WO 2011/107279 A1 | 9/2011 |
| WO | WO 2015/192874 A1 | 12/2015 |
| WO | WO2017015569 * | 1/2017 |

OTHER PUBLICATIONS

International Search Report, issued in PCT/NO2016/050045, dated Oct. 3, 2016.
Written Opinion of the International Searching Authority, issued in PCT/NO2016/050045, dated Oct. 3, 2016.
Andenaes, S. and R. A. Battista, Integrated Hydrogen Fueled Gas Turbines for Low CO2 Emission Power Plants. EFI Green Technologies, Jan. 31, 2000.
Brdar R. D. and R. M. Jones, GE IGCC Technology and Experience with Advanced Gas Turbines, GE Power Systems, GER-4207, Oct. 2000.
Cheddie, Denver, "Ammonia as a Hydrogen Source for Fuel Cells: A Review", Intech, Hydrogen Energy—Challenges and Perspectives—Chapter 13, pp. 333-362, 2012.

* cited by examiner

AMMONIA CRACKING

FIELD OF THE INVENTION

This invention relates to a process for generating power using a gas turbine, wherein the process involves the cracking of ammonia gas. The invention also relates to a process for producing a fuel for a gas turbine, wherein the process involves the cracking of ammonia gas. Furthermore, the invention relates to a system for generating power using a gas turbine, wherein the system comprises an ammonia-cracking device.

BACKGROUND

Ammonia ($NH_3$) cracking is the decomposition or dissociation of ammonia into its constituent components, namely hydrogen and nitrogen, and occurs according to equation (i):

$$2NH_3 \leftrightarrow N_2 + 3H_2 \quad (i)$$

As the forward reaction is endothermic ($\Delta H=+46.22$ $kJmol^{-1}$), ammonia cracking is typically conducted at elevated pressures and temperatures and also in the presence of a catalyst in order to ensure an efficient cracking process.

Ammonia cracking has a well-known small scale application in fuel cells, e.g. polymer electrolyte membrane fuel cells (see Chapter 13 of "Hydrogen Energy—Challenges and Perspectives", published 17 Oct. 2012, for a review).

Gas turbines are commonly used to generate power at power stations by combusting fuel therein. Non-renewable fuels can be used e.g. petrol, natural gas, propane, diesel and kerosene. However, renewable fuel sources are also employed e.g. biogas and biodiesel. One of the main problems associated with combusting fuels such as these in gas turbines is the resultant production of carbon dioxide ($CO_2$) gas. Increased $CO_2$ levels in the atmosphere are detrimental to the environment and are a known cause of global warming. As such, there is a need to provide fuels for use in gas turbines which do not generate $CO_2$ upon combustion, or from which $CO_2$ must be removed prior to combustion.

Ammonia is an example of completely carbon-free fuel. The main problem associated with the direct use of ammonia as a fuel in gas turbines is that during the combustion process, ammonia is oxidised to the nitrogen oxides NO and $NO_2$ (generically known as $NO_x$). $NO_x$ emissions contribute to a number of environmental problems including smog formation, acid rain and global warming. As such, there is a need to reduce the amount of $NO_x$ emissions being generated at power stations.

Hydrogen is a much sought-after environmentally-friendly fuel source as it contains no carbon and the only product of its combustion is water. There are, however, a number of problems associated with the use of hydrogen as a fuel. First, it is both difficult and expensive to transport and store hydrogen gas. One way of overcoming this issue is to first compress the gas or convert it into a liquid. However, these processes require a significant amount of energy and can be expensive. Second, existing power station infrastructure cannot be used to store or transport hydrogen and specially-designed storage containers and vehicles are required in order to be able to withstand the necessary low temperatures and pressures. This, of course, adds to the expense of using hydrogen as a fuel. Third, hydrogen is an extremely flammable gas and safety issues surrounding the handling of this fuel are a concern.

Three methods exist for $CO_2$ capture: Post-combustion (removing $CO_2$ from the exhaust), oxyfuel combustion (burning fossil fuel with oxygen) and pre-combustion (converting fossil fuel into hydrogen and removing $CO_2$ from the hydrogen stream). However, all methods needs a method for transporting and storing $CO_2$ close to the capture site. That can in many cases be challenging if a safe and suitable storage is not available.

Integrated gasification combined cycle (IGCC) is a technology that uses a high pressure gasifier to convert coal and Integrated Reforming Combined Cycle (IRCC) uses reforming to convert natural gas into a hydrogen-nitrogen fuel mixture. Also known as pre-combustion $CO_2$ capture, IGCC and IRCC involves removal of $CO_2$ from the fuel mixture prior to its combustion. An example of the use of IRCC technology is the Norsk Hydro Hydrokraft project (see Andenaes, S. and R. A. Battista (2000) Integrated Hydrogen Fueled Gas Turbines for Low CO2 Emission Power Plant. *EFI, Green Technologies*, January 31). In this project, a carbon-free fuel was generated from natural gas according to the following steps:
(i) Carbon was removed from natural gas and converted into carbon monoxide (CO) via reaction with steam and air;
(ii) The resultant CO was reacted with steam to produce hydrogen and $CO_2$;
(iii) The $CO_2$ was separated from the hydrogen to give a basic hydrogen fuel, which could then be combined with other additives e.g. nitrogen, water.
As part of the Hydrokraft project, the newly produced fuels were tested by burning in large frame 9F gas turbines. It was found that a mixture of 40-60% hydrogen, 40-60% nitrogen and 10-20% water was needed to ensure high turbine efficiency and also to maintain $NO_x$ formation at ppm levels. A fuel of this composition has therefore been found to be both an efficient and safe fuel for use in a gas turbine. An example of the use of IGCC is disclosed in the paper posted at https://powergen.gepower.com/content/dam/gepower-pgdp/global/en_US/documents/technical/ger/ger-4207-ge-igcc-technology-experience-advanced-gas-turbines.pdf.
Unfortunately, these existing processes for producing such a fuel involve the production and capture of $CO_2$ gas.

Thus, there still exists a need to provide an efficient fuel for use in gas turbines which is carbon-free, or avoids $CO_2$ capture at the power station, generates minimal $NO_x$ emissions upon combustion and is also easy to handle and store.

SUMMARY OF INVENTION

It has now been found that the ammonia cracking process, already known to be useful in fuel cells, can be integrated with a gas turbine for the efficient generation of power by combustion therein of the hydrogen and nitrogen mixture produced during the ammonia cracking process.

Thus viewed from one aspect, the invention provides a process for generating power using a gas turbine, comprising the steps of:
(i) vaporising and pre-heating liquid ammonia to produce pre-heated ammonia gas;
(ii) introducing said pre-heated ammonia gas into an ammonia-cracking device, wherein said device is suitable for converting ammonia gas into a mixture of hydrogen and nitrogen;
(iii) converting said pre-heated ammonia gas into a mixture of hydrogen and nitrogen in said device;
(iv) cooling said mixture of hydrogen and nitrogen to give a cooled hydrogen and nitrogen mixture;
(v) introducing said cooled hydrogen and nitrogen mixture into a gas turbine; and (vi) combusting said cooled hydrogen and nitrogen mixture in said gas turbine to generate said power.

Viewed from another aspect, the invention provides a process for producing a fuel for a gas turbine, comprising the steps of:
(i) vaporising and pre-heating liquid ammonia to produce pre-heated ammonia gas;
(ii) introducing said pre-heated ammonia gas into an ammonia-cracking device, wherein said device is suitable for converting ammonia gas into a mixture of hydrogen and nitrogen;
(iii) converting said pre-heated ammonia gas into a mixture of hydrogen and nitrogen in said device; and
(iv) cooling said mixture of hydrogen and nitrogen to give a cooled hydrogen and nitrogen mixture suitable for use as a fuel for a gas turbine.

Viewed from a further aspect, the invention provides a fuel produced according to the disclosed process.

Viewed from a further aspect, the invention provides a system for generating power using a gas turbine, comprising:
(i) a heat exchanger and vaporiser comprising an inlet for liquid ammonia and an outlet for pre-heated ammonia gas;
(ii) an ammonia-cracking device comprising an inlet for said pre-heated ammonia gas and an outlet for a mixture of hydrogen and nitrogen, wherein said ammonia-cracking device contains a catalyst;
(iii) a cooling unit comprising an inlet for said mixture of hydrogen and nitrogen and an outlet for a cooled mixture of hydrogen and nitrogen; and
(iv) a gas turbine comprising an inlet for said cooled mixture of hydrogen and nitrogen, wherein said gas turbine is suitable for the combustion of said cooled mixture of hydrogen and nitrogen to generate said power.

DETAILED DESCRIPTION

As used herein, the term "ammonia cracking" refers to the decomposition or dissociation (typically thermal decomposition or dissociation) of ammonia into its constituent components of hydrogen and nitrogen.

As used herein, the term "ammonia cracking device" refers to a device suitable for converting ammonia gas into a mixture of hydrogen and nitrogen in an ammonia cracking process, e.g. a catalytic ammonia cracking device containing a catalyst such as a nickel catalyst. The dissociation temperature in the presence of such a catalyst in such a device is typically in the region of 500-1100° C., e.g. 850-950° C.

Ammonia is one of the most widely produced commodity chemicals in the world (second only to sulfuric acid), with over 140 million tons being currently produced every year. As such, a worldwide distribution system for ammonia is already well established.

As discussed above, hydrogen is a desirable fuel for combustion in gas turbines due to its environmentally-friendly properties. Unfortunately, factors such as the difficulty of storage and transportation of hydrogen mean that its application to date in gas turbines has been limited. The application of ammonia as a direct fuel in gas turbines has also been limited, due to the tendency of ammonia to produce $NO_x$ emissions upon combustion.

To overcome these problems, the present inventors have found that an ammonia cracking process can be performed on-site at a power station to generate a fuel comprising a mixture of hydrogen and nitrogen, which can then be directly combusted in a gas turbine to generate power. The need to transport or store hydrogen gas is therefore avoided, as is the possibility of $NO_x$ emissions being produced upon combustion.

Ammonia can be liquefied at room temperature and at a pressure of around 8-10 bar. This means that it can be easily stored in the existing infrastructure at power stations; there is no need to provide specialist equipment able to withstand low temperatures and pressures, as would be the case for hydrogen fuel. Although ammonia is a toxic chemical, the present invention provides for on-site storage and handling of ammonia such that its use will always be overseen by skilled persons. Furthermore, and unlike hydrogen, ammonia has an odour that can be detected even at safe concentration levels, meaning any leaks can be quickly identified.

The present invention provides a process for generating power using a gas turbine, comprising the steps of:
(i) vaporising and pre-heating liquid ammonia to produce pre-heated ammonia gas;
(ii) introducing said pre-heated ammonia gas into an ammonia-cracking device, wherein said device is suitable for converting ammonia gas into a mixture of hydrogen and nitrogen;
(iii) converting said pre-heated ammonia gas into a mixture of hydrogen and nitrogen in said device;
(iv) cooling said mixture of hydrogen and nitrogen to give a cooled hydrogen and nitrogen mixture;
(v) introducing said cooled hydrogen and nitrogen mixture into a gas turbine; and
(vi) combusting said cooled hydrogen and nitrogen mixture in said gas turbine to generate said power.

The step of vaporising and pre-heating the liquid ammonia preferably occurs in apparatus comprising a heat exchanger and vaporiser. The conversion of liquid ammonia into pre-heated ammonia gas is preferably conducted at a temperature of 300-700° C. The conversion of liquid ammonia into pre-heated ammonia gas is preferably conducted at a pressure of 2-50 barg.

If necessary, the pre-heated ammonia gas can be pumped to a pressure matching the fuel pressure required for the gas turbine before introduction into the ammonia-cracking device. Preferably, the pre-heated ammonia gas is pumped to a pressure of 15-40 barg depending on the type and size of the gas turbine.

As the ammonia cracking reaction is an endothermic process, a fuel source is normally needed to assist the conversion of pre-heated ammonia gas into a mixture of hydrogen and nitrogen in the ammonia-cracking device. Any suitable fuel source can be employed, e.g. natural gas. Preferably, the fuel source comprises a portion of the cooled hydrogen and nitrogen mixture produced in the ammonia-cracking device. More preferably, the fuel source comprises 10-20% of a cooled hydrogen and nitrogen mixture.

The ammonia cracking process taking place in the ammonia cracking device, in which pre-heated ammonia gas is converted into a mixture of hydrogen and nitrogen, preferably occurs at a temperature of 500-1100° C. The ammonia-cracking device is typically a catalytic ammonia-cracking device. The catalytic ammonia-cracking device is preferably a reforming reactor, more preferably a convection pressure-pressure reforming reactor. Preferably, a supply of compressed air is fed into the ammonia-cracking device. More preferably, compressed air is extracted from the gas turbine and introduced into the convection pressure-pressure reforming reactor prior to the ammonia cracking process taking place. The use of recycled compressed air in this way reduces the amount of energy input required by the process because it avoids the need for an additional step of air compression to provide compressed air for the ammonia-cracking device.

A catalyst is preferably employed in the ammonia cracking device in order to ensure an efficient cracking process. A wide range of metals can be used as the ammonia cracking catalyst, especially transition metals such as nickel (e.g. as nickel oxide), iron (e.g. as iron oxide), manganese, platinum, palladium, lanthanum (e.g. as lanthanum oxide), molybdenum and zirconium, or a mixture of two or more of said catalysts. Preferably, the catalyst is a nickel catalyst e.g. supported nickel catalysts (on magnesium aluminium spinels) such as the nickel based non-alkali catalyst R-87 HEAT-X® sold by Haldor Topside.

Supported catalysts have been found to be particularly effective catalysts for the ammonia cracking process. Examples include nickel or nickel oxide supported on alumina or magnesium alumina and iron oxide supported on alumina. Metal alloys can also be employed, e.g. a nickel-ruthenium alloy or R-87 HEAT-X® described above.

Once the ammonia cracking process is complete, the resultant mixture of hydrogen and nitrogen is cooled to give a cooled hydrogen and nitrogen mixture. Preferably, the mixture of hydrogen and nitrogen is cooled to a temperature of 40-300° C. Once cooled, any unconverted ammonia gas can be removed from the cooled hydrogen and nitrogen mixture, e.g. by the use of a water scrubber. Removal of any unreacted ammonia at this stage in the process is advisable to avoid the formation of $NO_x$ in the later combustion step.

The composition of the mixture of hydrogen and nitrogen once cooled can be adjusted using purification techniques, e.g. membranes or pressure swing adsorption. The composition of the mixture of hydrogen and nitrogen exiting the ammonia cracking device can be adjusted using purification techniques, e.g. membranes or pressure swing adsorption.

A portion of the fluegas exiting the ammonia-cracking device, which comprises mainly nitrogen and water, can be fed into the cooled hydrogen and nitrogen mixture. Preferably, the fluegas comprises less than 2% oxygen, so that there is a low risk of ignition of the fluegas.

In order to make the process of the invention as efficient as possible, energy can be recovered at various stages. For example, a portion of the fluegas exiting the ammonia-cracking device can be expanded in an expander to recover energy therefrom. Excess heat generated by the ammonia-cracking device can also be used to produce steam, e.g. in a downstream heat recovery steam generator (HRSG) unit. At least a portion of the steam produced can then be fed into the cooled hydrogen and nitrogen prior to introduction into the gas turbine. Furthermore, excess heat generated by the gas turbine can be used to produce steam, e.g. in a downstream HRSG unit. At least a portion of the steam produced can be fed into the cooled hydrogen and nitrogen mixture prior to introduction into the gas turbine. Preferably, the cooled hydrogen and nitrogen mixture comprising at least a portion of said steam to be introduced into the gas turbine comprises 40-60% hydrogen, 40-60% nitrogen and 10-20% water.

The gas turbines used in the processes of the invention can be either onshore gas turbines or offshore gas turbines. In the instance of an offshore gas turbine being employed, the gas turbine is preferably connected to a floating ammonia storage tank.

Renewable energy systems are increasingly employed for power generation as a more environmentally friendly alternative to conventional systems, which often involve the burning of fuels. Wind turbines, for example, generate power as a result of the force of the wind acting upon them whilst solar panels generate power by capturing the solar energy falling upon them. In both of these situations, power can only be generated when the environmental conditions are correct for the specific renewable energy system being employed and, for example, in the case of a wind turbine no power will be generated on a still day without any wind. Despite the advantage of being more environmentally friendly, renewable energy systems can therefore be somewhat unreliable in terms of power generation.

Thus in an embodiment of the present invention, a gas turbine is associated with a renewable energy system, which preferably comprises a wind turbine, such that when the renewable energy system is unable to generate power, the cooled hydrogen and nitrogen mixture is combusted in the gas turbine to generate power. In this way, power can be generated in a continuous manner to ensure a more reliable supply thereof.

A particularly preferred process of the invention comprises the steps of:

(i) vaporising and pre-heating liquid ammonia to produce said pre-heated ammonia gas;

(ii) introducing said pre-heated ammonia gas into said ammonia-cracking device containing a catalyst, wherein said device is suitable for converting ammonia gas into a mixture of hydrogen and nitrogen;

(iii) extracting combustion air from said gas turbine;

(iv) introducing said combustion air into said ammonia-cracking device;

(v) converting said pre-heated ammonia gas into said mixture of hydrogen and nitrogen in said device containing a catalyst;

(vi) cooling said mixture of hydrogen and nitrogen to give said cooled hydrogen and nitrogen mixture;

(vii) introducing at least a portion of the fluegas comprising nitrogen and water exiting said ammonia-cracking device into said cooled hydrogen and nitrogen mixture;

(viii) introducing said cooled hydrogen and nitrogen mixture and said at least a portion of said fluegas into said gas turbine; and (ix) combusting said cooled hydrogen and nitrogen and said at least a portion of said fluegas in said gas turbine to generate said power.

The present invention also provides a process for producing a fuel for a gas turbine, comprising the steps of:

(i) vaporising and pre-heating liquid ammonia to produce pre-heated ammonia gas;

(ii) introducing said pre-heated ammonia gas into an ammonia-cracking device, wherein said device is suitable for converting ammonia gas into a mixture of hydrogen and nitrogen;

(iii) converting said pre-heated ammonia gas into a mixture of hydrogen and nitrogen in said device; and (iv) cooling said mixture of hydrogen and nitrogen to give a cooled hydrogen and nitrogen mixture suitable for use as a fuel for a gas turbine.

The present invention also provides a fuel produced according to the above-mentioned process.

The step of vaporising and pre-heating the liquid ammonia preferably occurs in apparatus comprising a heat exchanger and vaporiser. The conversion of liquid ammonia into pre-heated ammonia gas is preferably conducted at a temperature of 300-700° C. The conversion of liquid ammonia into pre-heated ammonia gas is preferably conducted at a pressure of 2-50 barg.

If necessary, the pre-heated ammonia gas can be pumped to a pressure matching the fuel pressure required for the gas turbine before introduction into the ammonia-cracking device. Preferably, the pre-heated ammonia gas is pumped to a pressure of 15-40 barg depending on the type and size of the turbine.

As the ammonia cracking reaction is an endothermic process, a fuel source is normally needed to assist the conversion of pre-heated ammonia gas into a mixture of hydrogen and nitrogen in the ammonia-cracking device. Any suitable fuel source can be employed, e.g. natural gas. Preferably, the fuel source comprises a portion of the cooled hydrogen and nitrogen mixture produced in the ammonia-cracking device. More preferably, the fuel source comprises 10-20% of a cooled hydrogen and nitrogen mixture.

The ammonia cracking process taking place in the ammonia cracking device, in which pre-heated ammonia gas is converted into a mixture of hydrogen and nitrogen, preferably occurs at a temperature of 500-1100° C. The ammonia-cracking device is typically a catalytic ammonia-cracking device. The catalytic ammonia-cracking device is preferably a reforming reactor, more preferably a convection pressure-pressure reforming reactor. A supply of compressed air is preferably fed into the ammonia-cracking device. This may be extracted from a gas turbine.

A catalyst is preferably employed in the ammonia cracking device in order to ensure an efficient cracking process. A wide range of metals can be used as the ammonia cracking catalyst, especially transition metals such as nickel (e.g. as nickel oxide), iron (e.g. as iron oxide), manganese, platinum, palladium, lanthanum (e.g. as lanthanum oxide), molybdenum and zirconium, or a mixture of two or more of said catalysts. Preferably, the catalyst is a nickel catalyst e.g. supported nickel catalysts (on magnesium aluminium spinels) such as the nickel based non-alkali catalyst R-87 HEAT-X® sold by Haldor Topside.

Supported catalysts have been found to be particularly effective catalysts for the ammonia cracking process. Examples include nickel or nickel oxide supported on alumina or magnesium alumina and iron oxide supported on alumina. Metal alloys can also be employed, e.g. a nickel-ruthenium alloy or R-87 HEAT-X® described above Once the ammonia cracking process is complete, the resultant mixture of hydrogen and nitrogen is cooled to give a cooled hydrogen and nitrogen mixture. Preferably, the mixture of hydrogen and nitrogen is cooled to a temperature of 40-300° C. Once cooled, any unconverted ammonia gas can be removed from the cooled hydrogen and nitrogen mixture, e.g. by the use of a water scrubber. Removal of any unreacted ammonia at this stage in the process is advisable to avoid the formation of $NO_x$ in any later combustion step.

The composition of the mixture of hydrogen and nitrogen exiting the ammonia cracking device can be adjusted using purification techniques, e.g. membranes or pressure swing adsorption.

A portion of the fluegas exiting the ammonia-cracking device, which comprises mainly nitrogen and water, can be fed into the cooled hydrogen and nitrogen mixture. Preferably, the fluegas comprises less than 2% oxygen, so that there is a low risk of ignition of the fluegas.

In order to make the process of the invention as efficient as possible, energy can be recovered at various stages of the process. For example, a portion of the fluegas exiting the ammonia-cracking device can be expanded in an expander to recover energy therefrom. Excess heat generated by the ammonia-cracking device can also be used to produce steam, e.g. in a downstream HRSG unit. At least a portion of the steam produced can then be fed into the cooled hydrogen and nitrogen mixture prior to introduction into the gas turbine. Preferably, the cooled hydrogen and nitrogen mixture comprising at least a portion of said steam to be introduced into a gas turbine comprises 40-60% hydrogen, 40-60% nitrogen and 10-20% water.

The present invention also provides a system for generating power using a gas turbine, comprising:
(i) a heat exchanger and vaporiser comprising an inlet for liquid ammonia and an outlet for pre-heated ammonia gas;
(ii) an ammonia-cracking device comprising an inlet for said pre-heated ammonia gas and an outlet for a mixture of hydrogen and nitrogen, wherein said ammonia-cracking device contains a catalyst;
(iii) a cooling unit comprising an inlet for said mixture of hydrogen and nitrogen and an outlet for a cooled mixture of hydrogen and nitrogen; and
(iv) a gas turbine comprising an inlet for said cooled mixture of hydrogen and nitrogen, wherein said gas turbine is suitable for the combustion of said cooled mixture of hydrogen and nitrogen to generate said power.

A particularly preferred system of the invention comprises:
(i) a heat exchanger and vaporiser comprising an inlet for liquid ammonia and an outlet for pre-heated ammonia gas;
(ii) an ammonia-cracking device comprising a first inlet for said pre-heated ammonia gas, a second inlet for combustion air, a first outlet for a mixture of hydrogen and nitrogen, and a second outlet for fluegas, wherein said ammonia-cracking device contains a catalyst;
(iii) a cooling unit comprising an inlet for said mixture of hydrogen and nitrogen and an outlet for a cooled mixture of hydrogen and nitrogen;
(iv) a gas turbine comprising an inlet for said cooled mixture of hydrogen and nitrogen and at least a portion of said fluegas, and an outlet for said combustion air, wherein said gas turbine is suitable for the combustion of said cooled mixture of hydrogen and nitrogen and said at least a portion of said fluegas to generate said power.

Preferably, a supply of compressed air is fed into the ammonia-cracking device. More preferably, the supply of compressed air is extracted from the gas turbine. The use of recycled compressed air in this way reduces the amount of energy input required by the system because it avoids the need for an additional step of air compression to provide compressed air for the ammonia-cracking device.

The ammonia-cracking device preferably comprises a further inlet for a portion of the cooled mixture of hydrogen and nitrogen produced in the ammonia-cracking device.

The gas turbines used in the systems of the invention can be either onshore gas turbines or offshore gas turbines. In the instance of an offshore gas turbine being employed, the gas turbine is preferably connected to a floating ammonia storage tank.

In an embodiment of the present invention, the gas turbine is associated with a renewable energy system, which preferably comprises a wind turbine, such that when the renewable energy system is unable to generate power, the cooled hydrogen and nitrogen mixture is combusted in the gas turbine to generate power. In this way, power can be generated in a continuous manner to ensure a more reliable supply thereof.

Preferably, the systems of the present invention further comprise a purification unit to adjust the composition of the hydrogen and nitrogen mixture prior to introduction in the cooling unit.

In order to make the systems of the invention as efficient as possible, energy can be recovered at various stages. For example, excess heat generated by the ammonia-cracking device can be used to produce steam, e.g. in a downstream HRSG unit. Furthermore, excess heat generated by the gas turbine can be used to produce steam, e.g. in a downstream HRSG unit.

The invention provides a number of advantages:

Carbon-based fuels are widely available (e.g. coal, natural gas) but generate $CO_2$ upon combustion, which has a negative impact on the environment, e.g. increased $CO_2$ levels are a contributing factor to the problem of global warming. The ammonia cracking process of the invention generates a mixture of hydrogen and nitrogen, which is a $CO_2$-free fuel that can be used in gas turbines.

Existing technology for producing $CO_2$-free fuel involves $CO_2$ capture at the power station. Alternatively, hydrogen can be used as a fuel directly, however, it must be compressed or converted into a liquid prior to transportation or storage. In both instances, specialist equipment is required which results in added expense.

Ammonia is a cheap and widely available commodity, e.g. it is used on a global scale as a fertiliser. A reliable supply of ammonia, the starting material for the processes of the present invention, is therefore guaranteed.

Unlike hydrogen, ammonia is a liquid at same temperature and pressure as LPG meaning that it is easily stored and handled. A worldwide ammonia distribution network is already in place and so there are no barriers to the transportation of ammonia to power stations.

The invention provides for on-site generation of fuel (in the form of a hydrogen and nitrogen mixture) from ammonia. A side-stream of the hydrogen and nitrogen mixture can be purified to fuel cell quality. As such, no provisions need be made for distribution of the fuel; it can simply be generated on demand. And form the basis for a hydrogen hub and distribution system.

The invention allows for large scale production of power using existing industrial scale gas turbines. As such, a low capital cost is involved in setting up the systems of the invention because new or specialist equipment is not required. Furthermore, the systems of the invention are compact and require only a minimum number of components.

The processes and systems of the invention are highly energy efficient. For example, energy can be recovered at various stages of the process, e.g. in a HRSG unit or turbo expander. If a HRSG unit is used, the steam produced therein can be fed into the cooled mixture of hydrogen and nitrogen to adjust the composition of the fuel. Fluegas exiting the ammonia-cracking device, which comprises mainly nitrogen and water, can also be fed into the cooled hydrogen and nitrogen mixture to adjust fuel composition. Alternatively, supplying the ammonia-cracking device with a feed of compressed air extracted from the gas turbine avoids the need for an additional air compression step. Furthermore, a portion of the hydrogen and nitrogen mixture produced in the ammonia-cracking device can be fed back into the ammonia-cracking device to act as a fuel source to drive the endothermic cracking reaction.

The fuels produced according to the invention generate minimal NO emissions upon combustion, which is advantageous considering the many environmental problems caused by $NO_x$. Furthermore, the composition of the fuel can be adjusted or optimised (e.g. by the addition of fluegas comprising nitrogen and water, by the addition of steam from a HRSG unit and/or by the addition of ammonia) so that NO emissions upon combustion are as low as possible and also that high gas turbine efficiency is achieved.

The systems of the invention are extremely flexible and therefore can be integrated with any existing power station comprising a gas turbine. This includes both onshore and offshore gas turbines.

The systems of the invention can also be integrated with a renewable energy system (e.g. one comprising a wind turbine or solar panel) such that when the renewable energy system is unable to generate power due to suboptimal environmental conditions, the systems of the invention can generate power by combusting a cooled mixture of hydrogen and nitrogen generated according to the processes of the invention. Thus, power can be generated in a continuous manner to ensure a more reliable supply.

DETAILED DESCRIPTION OF PREFERRED EMBODIMENTS

Figure 1:
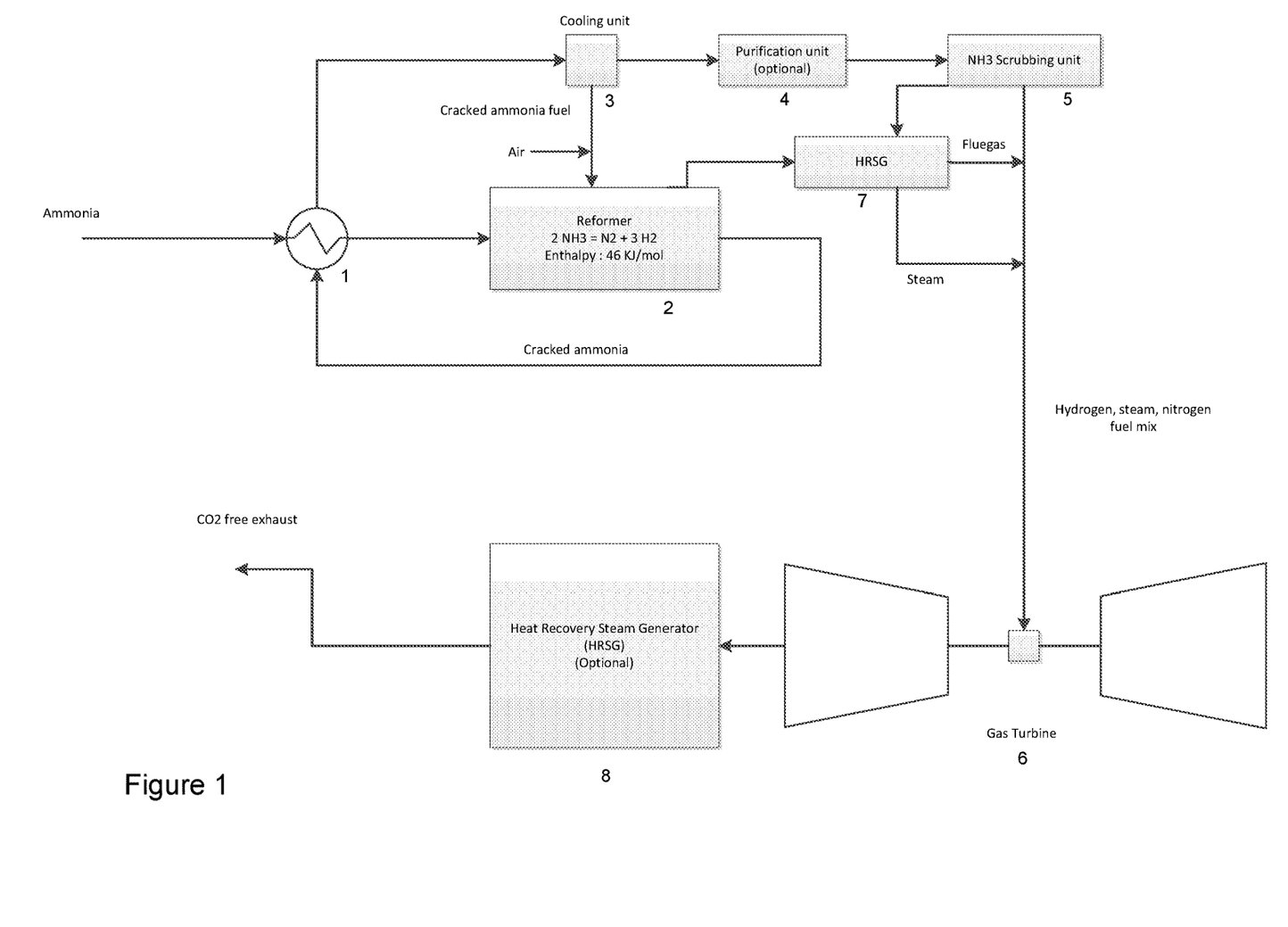
FIG. 1 shows a first system for generating power using a gas turbine according to the present invention.

Referring to FIG. 1, the operation of a first system according to the invention will now be described. Liquid ammonia enters heat exchanger and vaporiser 1 where it is vaporised and pre-heated to produce pre-heated ammonia gas. The pre-heated ammonia gas then enters an ammonia-cracking device 2, which contains a catalyst. Ammonia-cracking device 2 is also provided with an inlet for compressed air. In device 2, the ammonia-cracking process takes place and the pre-heated ammonia gas is converted into a mixture of hydrogen and nitrogen. This mixture of hydrogen and nitrogen passes through heat exchanger and vaporiser 1, and the majority then enters cooling unit 3 for additional cooling, using cooling water or air cooling. A portion of the hydrogen and nitrogen mixture is recycled back into the ammonia-cracking device 2 to drive the endothermic cracking reaction. The cooled mixture of hydrogen and nitrogen exiting cooling unit 3 can optionally be purified in a purification unit 4. Any unreacted ammonia remaining in the cooled hydrogen and nitrogen mixture (which has optionally also been purified) is removed in an ammonia scrubbing unit 5, which can be, for example, a water scrubber. The cooled hydrogen and nitrogen mixture exiting ammonia scrubbing unit 5 is then sent to a gas turbine 6 where it is combusted to generate power. The exhaust gas from the gas turbine is a completely $CO_2$-free exhaust gas.

Excess heat is removed from the fluegas exiting the ammonia-cracking device 2 in a HRSG unit 7. The steam produced in HRSG unit 7 can optionally be added to the cooled hydrogen and nitrogen mixture entering gas turbine 6. The fluegas passing through unit 7 can also optionally be added to the cooled hydrogen and nitrogen mixture entering gas turbine 6. Furthermore, a portion of the ammonia entering the system can optionally bypass heat exchanger and vaporiser 1 to be added to the cooled hydrogen and nitrogen mixture entering gas turbine 6.

Excess heat generated by the gas turbine can optionally be used to produce steam in a HRSG unit 8. At least a portion of the steam produced therein can be fed into the cooled hydrogen and nitrogen mixture entering gas turbine 6.

Figure 2:
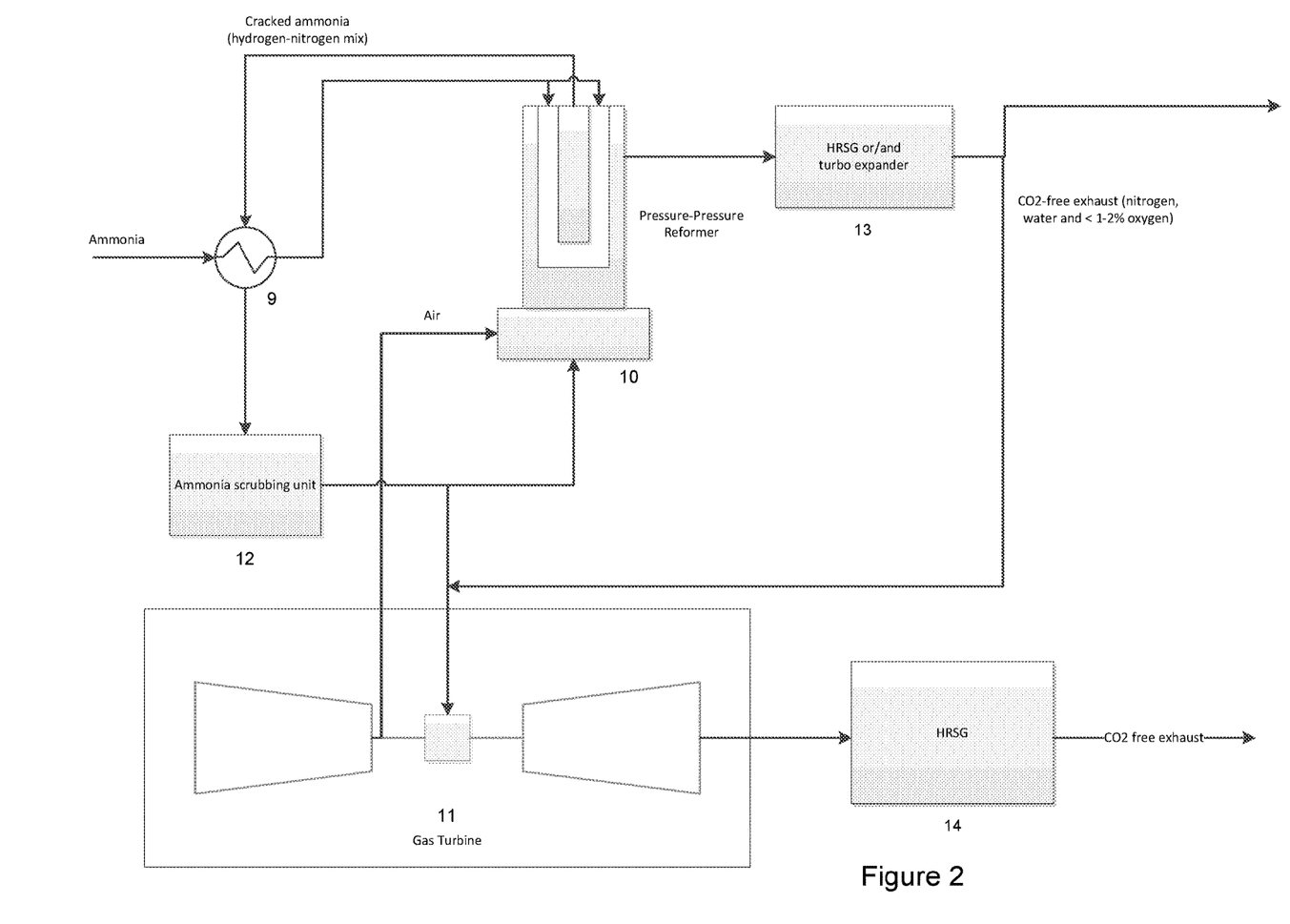
FIG. 2 shows a second system for generating power using a gas turbine according to the present invention.

Referring to FIG. 2, the operation of a second system according to the invention will now be described. Liquid ammonia enters heat exchanger and vaporiser 9 where it is vaporised and pre-heated to produce pre-heated ammonia gas. The pre-heated ammonia gas then enters an ammonia-cracking device 10, which is a pressure-pressure reformer and contains a catalyst, e.g. a supported nickel catalyst such as R-87 HEAT-X® sold by Haldor Topside. Ammonia-cracking device 10 is also provided with an inlet for compressed air, which is obtained from gas turbine 11. In device 10, the ammonia-cracking process takes place and the pre-heated ammonia gas is converted into a mixture of hydrogen and nitrogen. This mixture of hydrogen and nitrogen passes through heat exchanger and vaporiser 9 and a portion is recycled back into the ammonia-cracking device 10 to drive the endothermic cracking reaction. The remaining mixture of hydrogen and nitrogen is cooled in heat exchanger and vaporiser 9. Any unreacted ammonia remaining in the cooled hydrogen and nitrogen mixture is removed in an ammonia scrubbing unit 12, which can be, for example, a water scrubber. The cooled hydrogen and nitrogen mixture exiting scrubbing unit 12 is then sent to gas turbine 11 where it is combusted to generate power. The exhaust gas from the gas turbine is a completely $CO_2$-free exhaust gas.

Excess heat is removed from the fluegas exiting the ammonia-cracking device 10 in a heat recovery unit 13 (e.g. a HRSG unit or a turbo expander). At least a portion of the fluegas passing through unit 13 is added to the cooled hydrogen and nitrogen mixture entering gas turbine 11. Excess heat generated by the gas turbine is used to produce steam in a HRSG unit 14.

The invention claimed is:

1. A process for generating power using an offshore gas turbine, comprising the steps of:
   (i) vaporising and pre-heating liquid ammonia to produce pre-heated ammonia gas;
   (ii) introducing said pre-heated ammonia gas into an ammonia-cracking device, wherein said ammonia-cracking device is suitable for converting ammonia gas into a mixture of hydrogen and nitrogen;
   (iii) converting said pre-heated ammonia gas into a mixture of hydrogen and nitrogen in said ammonia-cracking device;
   (iv) cooling said mixture of hydrogen and nitrogen to give a cooled hydrogen and nitrogen mixture;
   (v) introducing said cooled hydrogen and nitrogen mixture into an offshore gas turbine; and
   (vi) combusting said cooled hydrogen and nitrogen mixture in said offshore gas turbine to generate said power;
   wherein unconverted ammonia gas is removed from said cooled hydrogen and nitrogen mixture prior to introduction of said cooled hydrogen and nitrogen mixture into said offshore gas turbine.

2. The process as claimed in claim 1, wherein a fuel source assists the conversion of said pre-heated ammonia gas into said mixture of hydrogen and nitrogen in said ammonia-cracking device.

3. The process as claimed in claim 1, wherein said vaporising and pre-heating of said liquid ammonia occurs at a temperature of 300-700° C. and/or at a pressure of 2-50 barg.

4. The process as claimed in claim 1, wherein said pre-heated ammonia gas is pumped to a pressure matching that required for said offshore gas turbine before introduction into said ammonia-cracking device.

5. The process as claimed in claim 1, wherein said ammonia-cracking device is a catalytic ammonia-cracking device containing a catalyst.

6. The process as claimed in claim 5, wherein said catalyst is selected from nickel catalysts, iron catalysts, manganese catalysts, platinum catalysts, palladium catalysts, lanthanum catalysts, molybdenum catalysts and zirconium catalysts, or mixtures thereof.

7. The process as claimed in claim 6, wherein said catalyst is supported on alumina or magnesium alumina.

8. The process as claimed in claim 1, wherein said converting of said pre-heated ammonia gas into said mixture of hydrogen and nitrogen occurs at a temperature of 500-1100° C.

9. The process as claimed in claim 1, wherein said mixture of hydrogen and nitrogen is cooled to a temperature of 40-300° C.

10. The process as claimed in claim 1, wherein the composition of said mixture of hydrogen and nitrogen is adjusted using purification techniques prior to and/or after cooling.

11. The process as claimed in claim 1, wherein step (iii) further produces a fluegas comprising nitrogen and water that exits said ammonia-cracking device, and a portion of said fluegas is fed into said cooled hydrogen and nitrogen mixture.

12. The process as claimed in claim 1, wherein step (iii) further produces a fluegas comprising nitrogen and water that exits said ammonia-cracking device, and a portion of said fluegas is expanded in an expander to recover energy therefrom.

13. The process as claimed in claim 1, wherein excess heat generated by said ammonia-cracking device is used to produce steam and at least a portion of said steam is fed into said cooled hydrogen and nitrogen mixture prior to introduction into said offshore gas turbine.

14. The process as claimed in claim 1, wherein excess heat generated by said offshore gas turbine is used to produce steam and at least a portion of said steam is fed into said cooled hydrogen and nitrogen mixture prior to introduction into said offshore gas turbine.

15. The process as claimed in claim 1, wherein said offshore gas turbine is connected to a floating ammonia storage tank.

16. The process as claimed in claim 1, wherein said offshore gas turbine is associated with a renewable energy system, such that when said renewable energy system is unable to generate power, said cooled hydrogen and nitrogen mixture is combusted in said offshore gas turbine to generate said power.

17. The process as claimed in claim 1, wherein said ammonia-cracking device contains a catalyst, and wherein the process further comprises:
   between steps (ii) and (iii), the steps of:
   (ii-a) extracting combustion air from said offshore gas turbine; and
   (ii-b) introducing said combustion air into said ammonia-cracking device;
   between steps (iv) and (v), the step of:
   (iv-a) introducing at least a portion of a fluegas, which is produced in step (iii), comprising nitrogen and water exiting said ammonia-cracking device into said cooled hydrogen and nitrogen mixture; and
   wherein in step (v) said cooled hydrogen and nitrogen mixture and said at least a portion of said fluegas is introduced into said offshore gas turbine; and
   wherein in step (vi) said cooled hydrogen and nitrogen mixture and said at least a portion of said fluegas is combusted in said offshore gas turbine to generate said power.

18. A system for generating power using an offshore gas turbine, comprising:

(i) a heat exchanger and vaporiser comprising an inlet for liquid ammonia and an outlet for pre-heated ammonia gas;
(ii) an ammonia-cracking device comprising a first inlet for said pre-heated ammonia gas and a first outlet for a mixture of hydrogen and nitrogen, wherein said ammonia-cracking device contains a catalyst;
(iii) a cooling unit comprising an inlet for said mixture of hydrogen and nitrogen and an outlet for a cooled mixture of hydrogen and nitrogen; and
(iv) an offshore gas turbine comprising an inlet for said cooled mixture of hydrogen and nitrogen, wherein said offshore gas turbine is suitable for the combustion of said cooled mixture of hydrogen and nitrogen to generate said power,
wherein said system further comprises an ammonia scrubbing unit to remove unconverted ammonia gas from said cooled hydrogen and nitrogen mixture prior to introduction of said cooled hydrogen and nitrogen mixture into said offshore gas turbine.

19. The system as claimed in claim 18,
wherein said ammonia-cracking device further comprises a second inlet for combustion air and a second outlet for fluegas;
wherein said offshore gas turbine further comprises an outlet for combustion air; and
wherein said inlet of said offshore gas turbine is for said cooled mixture of hydrogen and nitrogen and at least a portion of said fluegas, wherein said offshore gas turbine is suitable for the combustion of said cooled mixture of hydrogen and nitrogen and said at least a portion of said fluegas to generate said power.

20. The system as claimed in claim 18, wherein a supply of compressed air is fed into said ammonia-cracking device.

21. The system as claimed in claim 18, wherein said ammonia-cracking device comprises a further inlet for a portion of said cooled mixture of hydrogen and nitrogen produced in said ammonia-cracking device.

22. The system as claimed in claim 18, wherein said offshore gas turbine is connected to a floating ammonia storage tank.

23. The system as claimed in claim 18, wherein said offshore gas turbine is associated with a renewable energy system, such that when said renewable energy system is unable to generate power, said cooled hydrogen and nitrogen mixture can be combusted in said offshore gas turbine to generate said power.

24. The system as claimed in claim 18, further comprising a purification unit to adjust the composition of said hydrogen and nitrogen mixture prior to introduction in said cooling unit.

25. The system as claimed in claim 18, further comprising a HRSG unit downstream of said ammonia-cracking device and/or downstream of said offshore gas turbine.

* * * * *